(12) United States Patent
Potts

(10) Patent No.: US 8,617,390 B2
(45) Date of Patent: Dec. 31, 2013

(54) WASTEWATER SYSTEM WITH PRESSURE GRADIENT TRANSPORT

(76) Inventor: David A. Potts, Killingworth, CT (US)

( * ) Notice: Subject to any disclaimer, the term of this patent is extended or adjusted under 35 U.S.C. 154(b) by 562 days.

(21) Appl. No.: 12/944,405

(22) Filed: Nov. 11, 2010

(65) Prior Publication Data

US 2012/0118820 A1    May 17, 2012

(51) Int. Cl.
*B01D 35/00* (2006.01)

(52) U.S. Cl.
USPC ............ 210/120; 210/136; 210/137; 210/143

(58) Field of Classification Search
USPC .................................. 210/120, 136, 137, 143
See application file for complete search history.

(56) References Cited

U.S. PATENT DOCUMENTS

| | | | |
|---|---|---|---|
| 1,950,841 A * | 3/1934 | Crawford | 210/150 |
| 4,123,800 A | 10/1978 | Mazzei | |
| 4,702,787 A | 10/1987 | Ruskin et al. | |
| 5,052,625 A | 10/1991 | Ruskin | |
| 5,310,438 A | 5/1994 | Ruskin | |
| 5,332,160 A | 7/1994 | Ruskin | |
| 5,591,293 A | 1/1997 | Miller et al. | |
| 6,018,909 A | 2/2000 | Potts | |
| 6,024,513 A | 2/2000 | Hudgins et al. | |
| 6,334,958 B1 | 1/2002 | Ruskin | |
| 6,364,572 B1 | 4/2002 | Hudgins et al. | |
| 6,485,647 B1 | 11/2002 | Potts | |
| 6,749,368 B2 | 6/2004 | Ankeny et al. | |
| 6,821,928 B2 | 11/2004 | Ruskin | |
| 6,887,383 B2 | 5/2005 | Potts | |
| 6,923,905 B2 * | 8/2005 | Potts | 210/143 |
| 6,959,882 B1 | 11/2005 | Potts | |
| 6,969,464 B1 | 11/2005 | Potts | |
| 7,157,011 B1 | 1/2007 | Potts | |
| 7,309,434 B2 | 12/2007 | Potts | |
| 7,320,559 B2 | 1/2008 | Zupancic et al. | |
| 7,351,005 B2 | 4/2008 | Potts | |
| 7,445,168 B2 | 11/2008 | Ruskin | |
| 7,465,390 B2 | 12/2008 | Potts | |
| 2007/0095742 A1 | 5/2007 | Ruskin | |
| 2008/0000840 A1 | 1/2008 | Zupancic | |
| 2008/0087749 A1 | 4/2008 | Ruskin et al. | |
| 2009/0044321 A1 * | 2/2009 | Selman et al. | 4/219 |
| 2009/0242492 A1 | 10/2009 | Ruskin | |
| 2009/0250137 A1 | 10/2009 | Ruskin | |
| 2009/0282976 A1 | 11/2009 | Ruskin | |

OTHER PUBLICATIONS

Hepner et al., Alternative On-Lot Technology Research: Soil-Based Treatment Systems, Delaware Valley College Research Demonstration Center, Doylestown, Pennsylvania, USA (undated).*

Amador et al., Breath of Fresh Air, Cooperative Institute for Coastal and Estuarine Environmental Technology (CICEET), University of New Hampshire, http://ciceet.unh.edu, USA.

(Continued)

*Primary Examiner* — Chester Barry
(74) *Attorney, Agent, or Firm* — Grasso PLLC; Fred Grasso

(57) ABSTRACT

Wastewater system design, installation, maintenance and use are described and provided. In embodiments, design, installation, and maintenance of pressure gradients in a septic system serve to transport treatment tank gases, or other gases, downstream, towards or into a leach field, bio-filter, drain field, or other environment. Such transport may promote the displacement of gases or the remediation of gases.

21 Claims, 5 Drawing Sheets

(56) References Cited

OTHER PUBLICATIONS

Amador et al., Effects of Sand Depth on Domestic Wastewater Renovation in Intermittently Aerated Leachfield Mesocosms, Journal of Hydorlic Engineering, ASCE, Aug. 2008, USA.

Potts et al., Effects of Soil Aeration on a Failing Community Leach Field, USA.

Amador et al., Evaluation of Leachfield Aeration Technology for Improvement of Water Quality and Hydraulic Functions in Onsite Wastewater Treatment Systems, CICEET, September.

Potts et al., Effects of Aeration on Water Quality from Septic System Leachfields, J. of Environ. Qual., 33:1828-1838, 2004, Madison, Wisconsin, USA.

* cited by examiner

WASTEWATER SYSTEM WITH PRESSURE GRADIENT TRANSPORT

BACKGROUND

The present invention relates to septic system design, installation, maintenance, improvement and use. More specifically, the design, installation, maintenance, improvement and use of septic systems with pressure or thermal gradients that serve to transport treatment tank gases, or other gases, downstream, towards or into a leach field, bio-filter or other downstream environment.

Septic systems serve to provide onsite treatment and disposal of wastewater when public systems are inadequate or unavailable. Septic systems may be employed in residential and commercial developments. Systems may include a septic tank and a leach field downstream of the septic tank. The septic tank may serve to hold wastewater for a day or two, to allow for separation and sedimentation to occur. After retention and initial treatment, wastewater may then flow towards and into a leach field, where the wastewater may drain out of leaching lines in the field and into the material surrounding the leach lines, where further treatment and infiltration may occur.

BRIEF SUMMARY

Embodiments include processes, devices, systems, and articles of manufacture whereby pressure gradients with or without thermal gradients are employed to transport gases in a septic system. During transport, and upon reaching a target destination, the gases may be remediated in part or in full. The remediation may include reducing levels of methane, hydrogen sulfide, carbon dioxide, radon, or other gases being transported. The remediation may be facilitated by active systems and passive systems and may employ in-situ treatment, mixed in-situ treatment and extraction, and extraction systems.

Aerobic and anaerobic microorganism activity may serve in the remediation process, and filtering and/or absorption may also be used. In addition to creating pressure gradient systems, monitoring for target pressures, target gas levels, and target effluent may also be conducted. This monitoring may be used to manage treatment, control system setting, manage effluent, manage dosing, and for other reasons as well. Management may be conducted through sensors and systems calibrated to receive the sensor data and manage system settings or provide recommendations for system settings. The sensors and management system settings may be used for other reasons as well. Thus, numerous embodiments of the invention are possible.

Embodiments can include devices, systems, methods, and articles of manufacture. Embodiments can include computer devices with a readable memory and a processor in communication with the computer readable memory. The memory may contain instructions, which when executed by the processor, configure the processor to, upon receipt of an input indicating a sample result representing effluent gas from a subsurface leaching field of a sampled septic system, compare the input indicating the sample result with a target for effluent gas and provide one or more pressure or vacuum settings for a pressure gradient system acting on the sampled septic system. There may be numerous other device embodiments as well.

Embodiments can also include a subsurface septic system treatment tank, the treatment tank substantially protected from ground water entry and rain water entry. Treatment tanks can include septic tanks, pump tanks, aerobic tanks, similar tanks, and other types of vessels as well. A pressure gradient system may be in fluid communication with the treatment tank, where the pressure gradient system acts on head space in the treatment tank to create a pressure gradient serving to transport head space gases towards a treatment area, such as a leaching field, downstream of the treatment tank. Embodiments can also include a second pressure gradient system in fluid communication with the treatment tank where the second pressure gradient system acts on head space in the treatment tank to create a pressure gradient serving to transport head space gases towards the leaching field, which may also be referred to as a drain field, downstream of the treatment tank. Here, the second pressure gradient system may be downstream of the treatment tank and the first pressure gradient system may be within or upstream of the treatment tank.

Embodiments can also include processes that serve to reduce discharge of septic system gases in a septic system fed by a wastewater source, where the wastewater source can have vents serving to vent plumbing discharge lines. Aspects of this process can include operating a sub-surface treatment tank, where the treatment tank is substantially enclosed from ground water entry and rain water entry, and operating a pressure gradient system in fluid communication with the sub-surface treatment system. In embodiments, the pressure gradient system may serve to restrict head space gases of the treatment tank from discharging upstream through one or more plumbing vents or other vents of a wastewater source. In certain embodiments the wastewater source is a residential home and the wastewater passes through the pressure gradient system before reaching the treatment tank. In embodiments gravity fed and pressurized leach fields or other systems may be employed.

Still further embodiments also include nontransitory computer readable media that comprise computer readable instructions, where the instructions, which when run by a processor, configure a processor to, upon receipt of an input indicating a sample result representing effluent gas from a treatment tank or a subsurface leaching field of a sampled septic system or both, compare the input indicating the sample result with a target for tank gas, effluent gas, or other gas, and provide one or more pressure or vacuum settings for a pressure gradient system acting on the sampled septic system.

DETAILED DESCRIPTION

Figure 1:
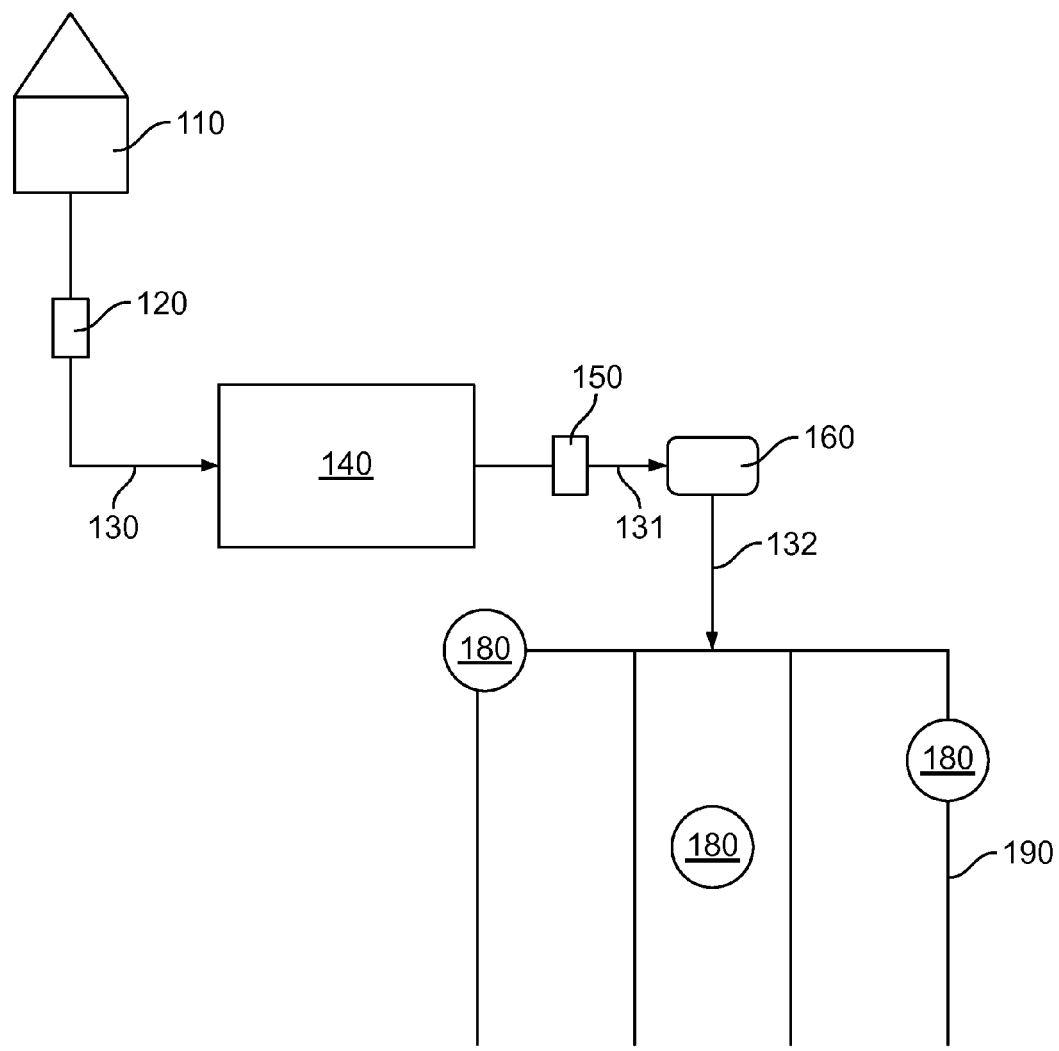
FIG. 1 shows a septic system employing one or more pressure gradients in accord with embodiments of the invention.

Embodiments can serve to reduce the emission of greenhouse and other gas emissions from septic systems. Embodiments can serve to influence or reduce emissions of septic tank gases, which can include carbon dioxide, methane and hydrogen sulphide, to the atmosphere via a house vent, septic tank access port, or other access port serving as a vent.

Various sources of gas may be managed or treated by embodiments of the invention. These can include wastewater gases and radon gases from an upstream source and downstream gases resident in the soil of a leaching field or other downstream system. In embodiments, the percentage of downstream gases that are treated may be smaller than the percentage of upstream gases that are treated. This difference may in part be due to a more meaningful increase in aerobic microbial activity for microorganisms treating the upstream gases than the downstream gases and in part due to the length of time during which the upstream gases will be treated when compared to the downstream gases.

Various designs and devices may be employed to promote a pressure gradient for moving gases towards a downstream remediation area or target. In septic systems employing a treatment tank, a valve or valve system may be used to create a pressure gradient when water wastewater flows to the treatment tank. Such a valve or valve system may also serve to retain methane or other treatment tank gases in the septic system, and to retard or prevent the flow of these gases back up through the home or other wastewater source. A temperature variant gradient may also be created, in part, between the treatment tank and the wastewater source. The valve or valve system may serve to promote and then dissipate this temperature gradient as well. Embodiments, thus, may serve to reduce greenhouse gas emissions from wastewater treatment and septic systems. For example, methane may be converted to carbon dioxide.

In embodiments, a check valve, trap, or other suitable gas trap device may be positioned upstream of the treatment tank to retard or prevent gases from exiting an upstream line or vent to atmosphere. This upstream check valve may be used in conjunction with an active generation of a pressure gradient in the treatment tank or elsewhere. Thus, as noted above, this active pressure gradient may further serve to transport methane or other holding tank gases to the leaching field, bio-filter or other target treatment area.

In embodiments, a sub-atmospheric pressure gradient may be created at the tank to promote gas flow to a soil treatment system. Here, the aforementioned check valve may be utilized on the outlet of the tank and a partial vacuum may be applied to the tank. In this configuration, air may be pulled in from the roof vent, a plumbing vent, a radon remediation system, a subsurface intake, a covered screened intake, or elsewhere, and this air, along with the gas from the tank, may be directed outward, into soil or bio-filters, for treatment. In extremely cold weather, it may be preferred to utilize a check valve at the tank inlet and ensure that adequate air flow is provided for by using an air inlet into the soil surrounding the tank. Leakage from access ports on the tank may also provide sufficient air input to the tank. Bio-filters may include devices that filter like carbon, as well as systems and organisms that treat or consume or remediate the waste.

In embodiments, a permeable filter can be installed in the leach field or adjacent to the leach field with sufficient contact area to provide conversion of methane and hydrogen sulphide to carbon dioxide. This filter can consist of a perforated pipe embedded in stone, similarly functioning geotextile devices, plastic leaching chambers, and any other similarly functioning systems may also be used. Also, additional organic substances can be utilized to facilitate or promote remediation of methane or other treatment tank gas. The filter may be installed in any wastewater system, including those with leaching fields. The filter may serve at least two purposes: treating wastewater and facilitating remediation of greenhouse gases.

The organic substances that may be injected or otherwise used to promote remediation may be microorganisms, microorganisms treated to be innocuous, enzymes that serve to promote microbial activity, organic media, blended organic matter, compost, as well as other materials and substances that can serve to promote microbial activity and the transformation or consumption of methane, hydrogen sulphide, or other gases, into less caustic, or generally less significant greenhouse gases, or otherwise less offensive gases.

In embodiments, the onsite remediation of gases may also be preferred over public systems as onsite systems can serve to recharge the aquifer near the water use and because the cost and expense of piping to centralized municipal wastewater systems as may be used in public systems may be deferred or avoided. Still further, embodiments may be used for periods of time, including prolonged periods of time, in the months and years, until such time as centralized municipal wastewater treatment systems become available or otherwise feasible.

As noted above, gases that may be affected by pressure gradients of embodiments can include methane, carbon dioxide, radon, and hydrogen sulfide. Other gases may be affected as well. In embodiments, movement of some of the gases may be preferred for remediation, recirculation, and for other reasons as well. Treatment of these gases may be provided at least in part by existing compounds and organisms in the target discharge leach field. Treatment may also be provided by additions made to the leach field. These additions can include the use of treatment gases, treatment substances, and treatment organisms. Organic substances can be part of the treatment substances and may serve to enhance microbial activity in the leach field. This microbial activity may be intended for aerobic conditions as well as anaerobic conditions.

FIG. 1 shows a plan view of a gravity-fed septic system as may be employed in accord with embodiments of the invention. Visible in FIG. 1 are an upstream wastewater source 110, an upstream pressure gradient system 120, an upstream input line 130, a treatment tank 140, a downstream pressure gradient system 150, a downstream output line 131, a distribution box 160, a distribution line 132, and a downstream effluent discharge system, the downstream effluent discharge system consisting of several effluent discharge lines 190. Also visible in FIG. 1 are sampling covers 180, some of which reside atop effluent discharge lines 190, while others are placed between effluent discharge lines 190.

In embodiments a pressure gradient may be imposed on the treatment tank 140 such that gases in the tank 140 are retarded from traveling in the upstream direction (opposite the direction of arrow 130). Instead, the pressure gradient resident in the treatment tank 140 may serve to urge, force, or otherwise transport gases from the tank 140 to the distribution box 160, through the distribution line 132, and into the effluent discharge lines 190. Once there, in addition to during transport, the treatment tank gases and other gases from upstream may be remediated. The treatment tank in embodiments, as well as other systems described herein, may be below grade wherein the top of the tank is positioned inches or feet below overburden placed atop the tank or existing in nearby undisturbed areas.

As noted above, treatment tank gases, such as methane, when exposed to an aerobic environment, may be converted and broken down by bacteria. Thus, in embodiments, rather than venting treatment tank gases back upstream through the wastewater source and into the atmosphere, these treatment tank gases may, instead, be remediated by their movement and transport downstream of the treatment tank towards and into effluent discharge lines. As discussed above, and in more detail below, a pressure gradient may be created or bolstered by pumps or blowers and one or more check valves, which serve to isolate the tank and or the field from other systems. In some embodiments, check valves may be used to isolate a tank from a downstream leaching field such that when a vacuum placed on the tank draws, gas is mainly drawn from the tank gas headspace and not a downstream leach field.

The upstream pressure gradient system may include a check valve as well as a blower. The check valve may serve to resist or retard non-compressible fluid flow back up through the lines towards and into the wastewater source 110. The wastewater source 110 in embodiments can be a residence, a commercial property or other source of wastewater serviced by an onsite subterranean wastewater remediation system. In embodiments, the blower may also serve to draw radon gas from the house and transport this radon gas to the treatment tank.

A downstream pressure system may also be used to draw gases out of the treatment tank. When a check valve is installed at the tank outlet, the gas stream can be directed into the same leaching system utilized for treatment and disposal of household wastewater.

In certain instances, the gas collected can be directed into the soil beneath the leach field. Enhanced nitrogen removal may be promoted by denitrifying microorganisms in the soil. The gas collected can also be directed into the groundwater to enhance nitrogen removal. Embodiments may still further be suited for use with tank separation enhancement and a dosing/measuring device.

In embodiments, the downstream pressure gradient system 150 may draw a vacuum on treatment tank 140 such that gases may be drawn out of the tank 140 and into and through the distribution box 160, and ultimately to the effluent discharge lines 190. In embodiments, the treatment tank gas effluent discharged to lines 190 may be dissipated or remediated along the way, during their transport, prior to finally reaching the lines 190.

In embodiments, the treatment tank 140 may be a septic tank as well as a distribution box or other vessel in a septic system that intentionally or unintentionally serves to have a void that contains effluent gases. The tank may contain organic matter and water. There, methanogens may generate methane, while downstream methanotrophs may serve to transform the methane to carbon dioxide.

In embodiments, the induced flow rates attributable to components of the upstream pressure gradient system 120 and components of the downstream pressure gradient system 150 may be adjusted to change the effectiveness of the system. In embodiments, sampling of effluent gases, using sampling covers 180, may be conducted and flow rates or induced pressures of upstream or downstream systems may be modified. Sampling may be drawn, analyzed, and monitored at the treatment tank, at the leach field, at the vent, or at other locations in the septic system and connected to the septic system. For example, if a downstream pressure gradient system was in use, its flow rate may be measured and samples of effluent gas from the leach field or other downstream system may be taken with methane or other gas being sampled for. Considering the sampling results, the draw of the downstream system may be increased or decreased. Still further, if an upstream system were also installed, it may be started, stopped, or otherwise adjusted.

In embodiments, the upstream pressure gradient system 120 may only include a check valve or trap without the use of a blower. In these instances, the check valve or trap may serve to retard the flow of holding tank gases back up to the vents of the wastewater source 110. Optionally, at the same time, a pressure gradient may also be created within the treatment tank, where the gradient may serve to transport treatment tank gases towards and into the effluent discharge lines 190.

Samples may be taken through the sampling covers 180 to determine if a design employing a check valve without an active upstream pressure system blower may be sufficient to transport intermediate holding tank gases such as methane, ozone, or other gas being treated by the system. The sampling covers may penetrate though the grass layer in order to trap gases rising from buried drip lines. The walls of the sampling covers may or may not be of a length that is long enough to reach the distribution lines buried in the soil. Various other soil gas sampling techniques are provided in U.S. Pat. No. 6,018,909 to D. Potts, the disclosure of which is incorporated herein with regard to the soil gas sampling techniques and related devices disclosed therein.

In embodiments, some or all components of the upstream pressure gradient system, including a check valve and a blower when they are used, may be positioned at the inlet of the tank. In some embodiments, the components may be positioned further upstream in the source of the wastewater. And, in some embodiments, the check valve, blower, or other components of the upstream pressure gradient system may be positioned among and between the inlet of the tank and the source of the wastewater.

In embodiments, the downstream pressure gradient system 150 may include a vacuum operating at 39 CFM and drawing headspace gases from the holding tank 140 around the check valve and towards the distribution box 160, as well as towards distribution 132.

As explained in other figures, and elsewhere in the specification, numerous configurations of the invention are plausible. For example, embodiments of the invention can include various combinations of check valves as well as upstream blowers and downstream vacuum systems.

In embodiments, a blower may be located within the house which is serving as the upstream wastewater source 110. In these situations, as well as others, the blower may be operating at a flow rate of 5 ft.$^3$ per minute, 10 ft.$^3$ per minute, or at other ratings, as may be required to obtain the desired remediation effect.

The vacuum, blower or other systems or devices used to create or maintain the pressure gradient, may be periodically activated to create a gas dosing schedule. Pressure may be monitored and released towards the leach field. Gases may also be monitored and released when certain thresholds are met or satisfied. This monitoring can monitor for specific gases, such as methane, carbon dioxide, hydrogen sulfide, and radon. Explosive levels may also be monitored such that when levels exceed a high explosive level threshold, the venting or blowing may be activated until a lower threshold explosive level is reached. In embodiments, a non-explosive level may be maintained by keeping explosive level readings outside of a gas mixture that is deemed to be explosive. Periodic gas dosing may also be employed such that predetermined times, ranges or times, or other periods of pressure gradient dosing may be carried out. In other words, these dosing situations may include activating the blower or vacuum every day or every other day for thirty minutes or some other period of time in order to send tank head gases towards the leaching field. In this embodiment, as well as in others, gases sent towards the leaching field may reach the field and may not. These gases may be dissipated in part or in full along their movement towards the leaching field. During transport, methane may be mixed by oxygen and, thereby, promote an environment whereby microorganisms may consume methane during transport to the leach field.

Figure 2:
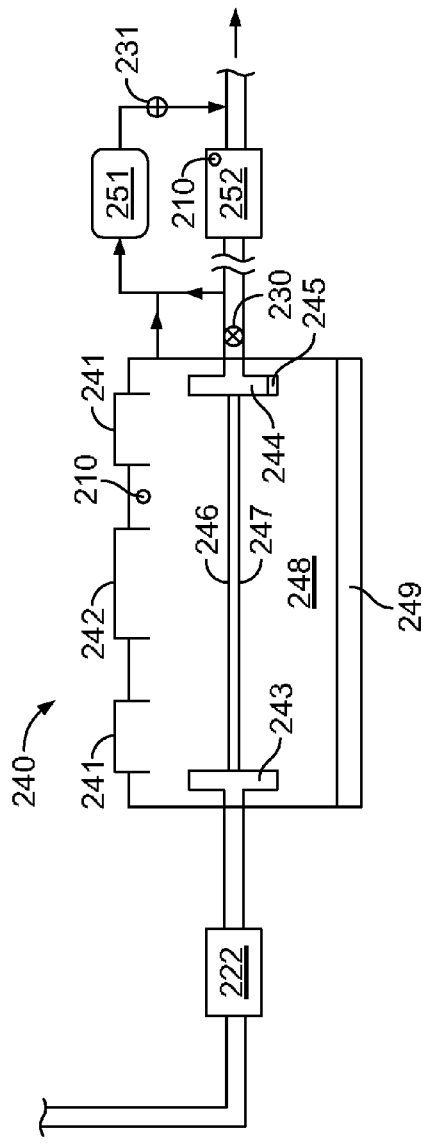
FIG. 2 shows a schematic of a treatment tank and downstream pressure gradient system as may be employed in a septic system in accord with embodiments of the invention.

FIG. 2 shows a hybrid view of a treatment tank with a check valve and downstream pressure system as may be employed in embodiments. Visible in FIG. 2 are a treatment tank 240, small access ports 241, large access port 242, a compressible fluid flow restrictor 222, a filter 231, a check valve 230, sensors 210, a compressible fluid flow restrictor 252, a pressure system 251, t-inlet 243, t-outlet 244, a screen 245, stored water 248, a water line 247, a scum layer 246, and a layer of sludge 249. As can be seen, a septic tank may be incorporated into embodiments, however, other tanks or storage devices may also be used.

In FIG. 2 the effluent begins upstream of a check valve 222, flows into the treatment tank 240, and then out through the t-outlet 244, towards the compressible fluid restrictor 252. In embodiments, the treatment tank may be water tight and or gas tight, with the large access ports and the small access ports also being sealed such that the t-inlet (which is sometimes referred to as a t-baffle) and the t-outlet provide substantially all of the influent and effluent of fluids and non-compressible fluids into or out of the treatment tank. In embodiments, the upper opening of the t-inlet or other similarly functioning inlets, may be sealed or restricted to retard or prevent methane or other treatment tank gas from flowing back into the house piping system or other upstream source.

In embodiments, a compressible fluid flow restrictor may serve to allow for wastewater to flow from a wastewater source, to pass through it and into the holding tank, and to slow down or even prevent holding tank gases from passing in the opposite direction, towards the wastewater source. In so doing, tank gases may be held under pressure in the holding tank such that a grading is created that serves to transport holding tank gases towards check valve 250, and later on to the leach field.

In embodiments, gases may be transported from the treatment tank, to the field. In the field, the gases may move up through the soil to atmosphere. As the gases move through the soil they may be treated. A large percentage of the gas remediation may occur in the soil but some remediation can occur in the stone or other components of the septic system.

Embodiments may include only the upstream check valve 222, solely the compressible fluid flow restrictor 254, as well as combinations of both and other components. In some embodiments a sufficient pressure gradient may be created through the use of a single upstream compressible fluid flow restrictor 222. In other embodiments, the use of the compressible fluid flow restrictor 252 may be sufficient to create an adequate pressure gradient. In embodiments, the pressure system 251 may work in conjunction with the compressible fluid flow restrictor 252 to create a downstream pressure gradient urging tank gases from the holding tank, towards the leaching field.

In embodiments, the pressure system 251 may be coupled to the input line of the check valve 252 and may also be coupled to the tank 240 as well. As shown in FIG. 2, the pressure system 251 may draw gases from the holding tank 240 and insert these gases downstream of the compressible fluid flow restrictor 252. In so doing, the pressure system 251 may be drawing a vacuum, creating a pressure gradient within the holding tank 240.

Figure 3:
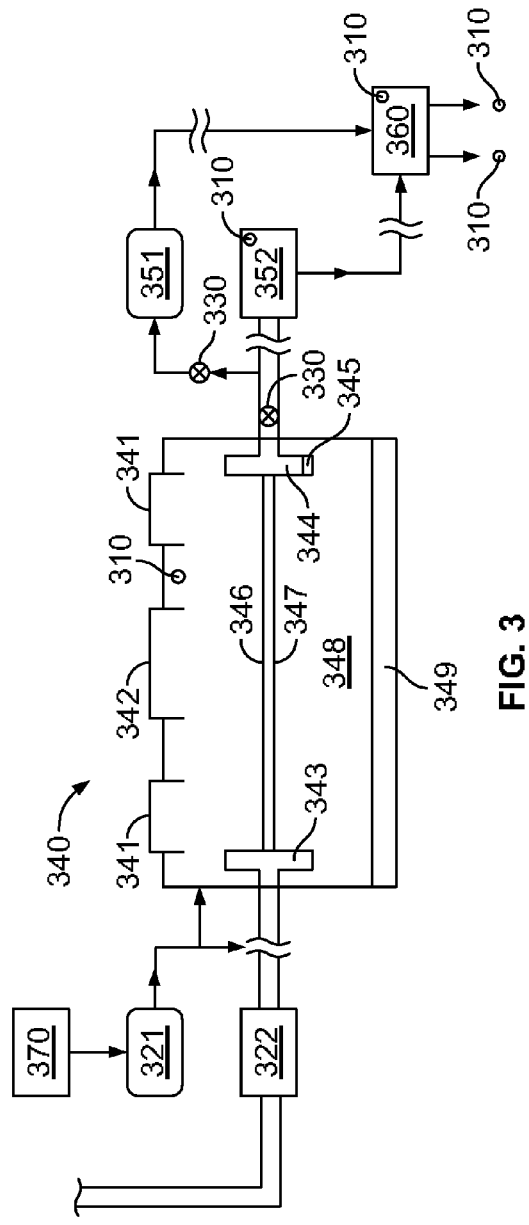
FIG. 3 shows a schematic of a treatment tank and multiple pressure gradient systems as may be employed in a septic system in accord with embodiments of the invention.

FIG. 3 shows embodiments may employ the holding tank and both upstream and downstream pressure systems. Visible in FIG. 3 are a holding tank 340, small access ports 341, large access port 342, pressure system 321, fluid flow restrictor 322, sensors 310, check valves 330, radon remediation input 370, t-inlet 343, t-outlet 344, sludge 349, water line 348, scum 346, screen 345, pressure system 351, fluid flow restrictor 352, and splitter distribution box 360. In embodiments, upstream pressure systems may be employed, downstream pressure systems may be employed, and various combinations of pressure systems, both upstream and downstream may also be employed.

FIG. 3 shows an embodiment wherein upstream and downstream pressure systems are employed in order to create a pressure gradient that serves to transport holding tank gases towards a splitter distribution box, and ultimately to a downstream effluent discharge system. As can be seen, the embodiment of FIG. 3 shares similar components with the embodiment shown in FIG. 2.

The upstream fluid flow restrictor in this embodiment, as well as others, may include a mechanical valve, as well as various types of traps or other systems performing similar functions. In preferred embodiments, the valves or traps can serve to restrict or retard the upstream flow of holding tank gases under various pressure gradients.

As can be seen in FIG. 3, pressure system 351 may serve to move gas around the fluid flow restrictor 352, from the holding tank 340 to the splitter distribution box 360. As can be seen in FIG. 3, pressure system 351 may be coupled to the inlet line of fluid flow restrictor 352 and not the holding tank 340. In embodiments, however, pressure system 351 may instead be coupled to the holding tank 340 or coupled to both a holding tank 340 and upstream input lines to the fluid flow restrictor 352.

Figure 4:
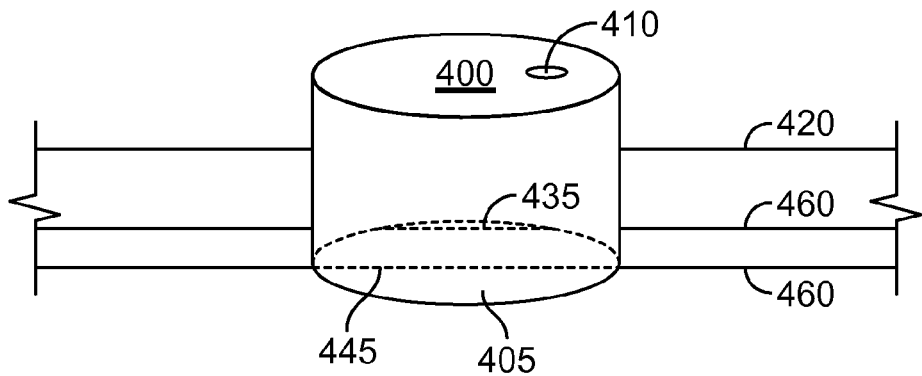
FIG. 4 shows a collector as may be used to measure effluent from buried leaching field lines as may be employed in accord with embodiments of the invention.

FIG. 4 shows a hybrid view of a collector 400 as may be employed in embodiments. When calibrating effluent and gradient pressures, as well as flow rates, samples above the leaching lines may be collected. The samples may be collected by using the collector 400 and by placing the collector on top of or between leaching lines as shown in FIG. 4. In other words a collector, which is shown as a cylindrical can, having a sample port 410, and an opening 405, may be used to capture, gather, and sample effluent gases from buried leaching lines and or the overlying soil. The samples may confirm the absence of remediation gases from the effluent of the leaching lines, as well as reduced levels of these gases. As may be necessary, vacuum pressures and/or blower flow rates may be adjusted to provide for target effluent gas percentages or readings. In embodiments, the absence of remediation gases and or atmospheric gases may be measured and quantified to determine the efficiency of the system. This quantification can be in ppm as well as in percentages or other units. As noted and taught, samples may be taken from various places include the tank, field, and other locations in and around the system.

Figure 5:
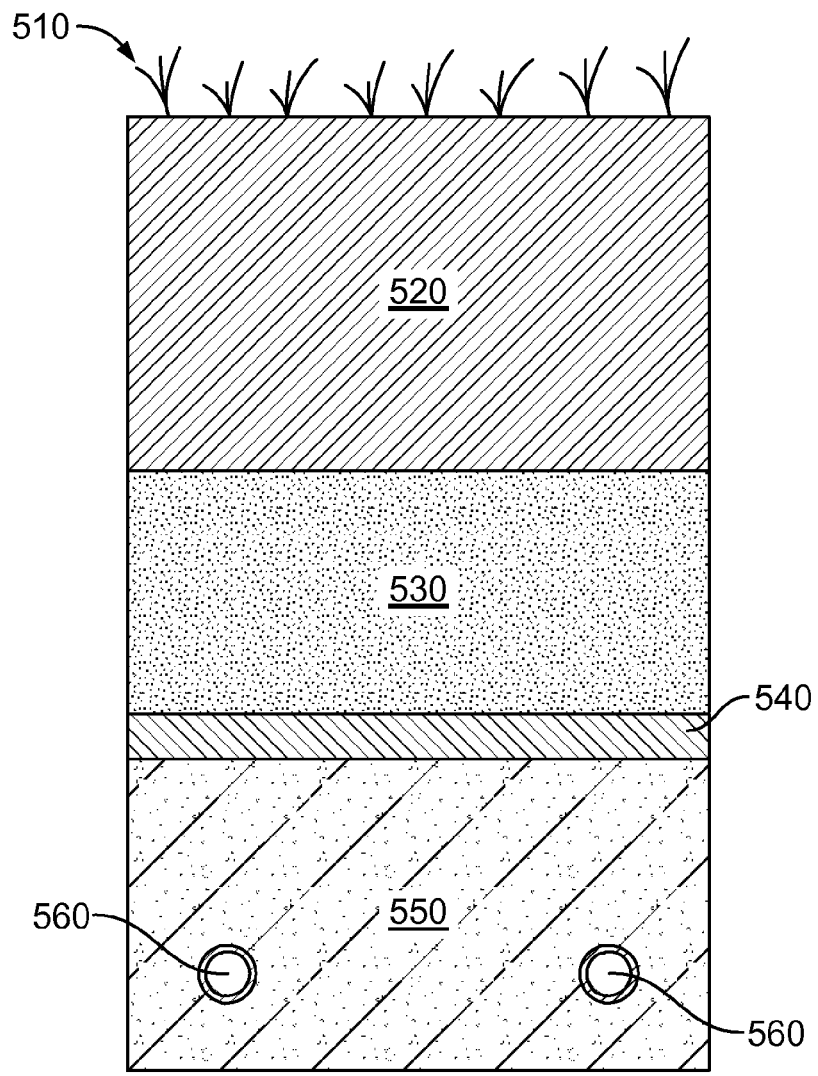
FIG. 5 shows a sectional view of overburden as may be employed in accord with embodiments of the invention.

FIG. 5 shows a sectional view of a leaching field as may be employed in accord with embodiments. As can be seen, five layers of overburden may be employed in embodiments. These may include grass 510, as the top layer, topsoil 520, beneath the grass, a sandy loam below that and a filter fabric 540 atop a stone bed 550 containing the leaching lines 560.

The topsoil 520 may be 3 inches in thickness and the sandy loam may be 2 to 3 inches in thickness. The filter fabric may be a few centimeters or millimeters in thickness and the stone may be 3 to 6 inches in thickness. Thus, FIG. 5, like the other figures, is not drawn to scale. Moreover, the overburden configuration may be modified according to local practice and/or local health department or other regulating body requirements.

Figure 6:
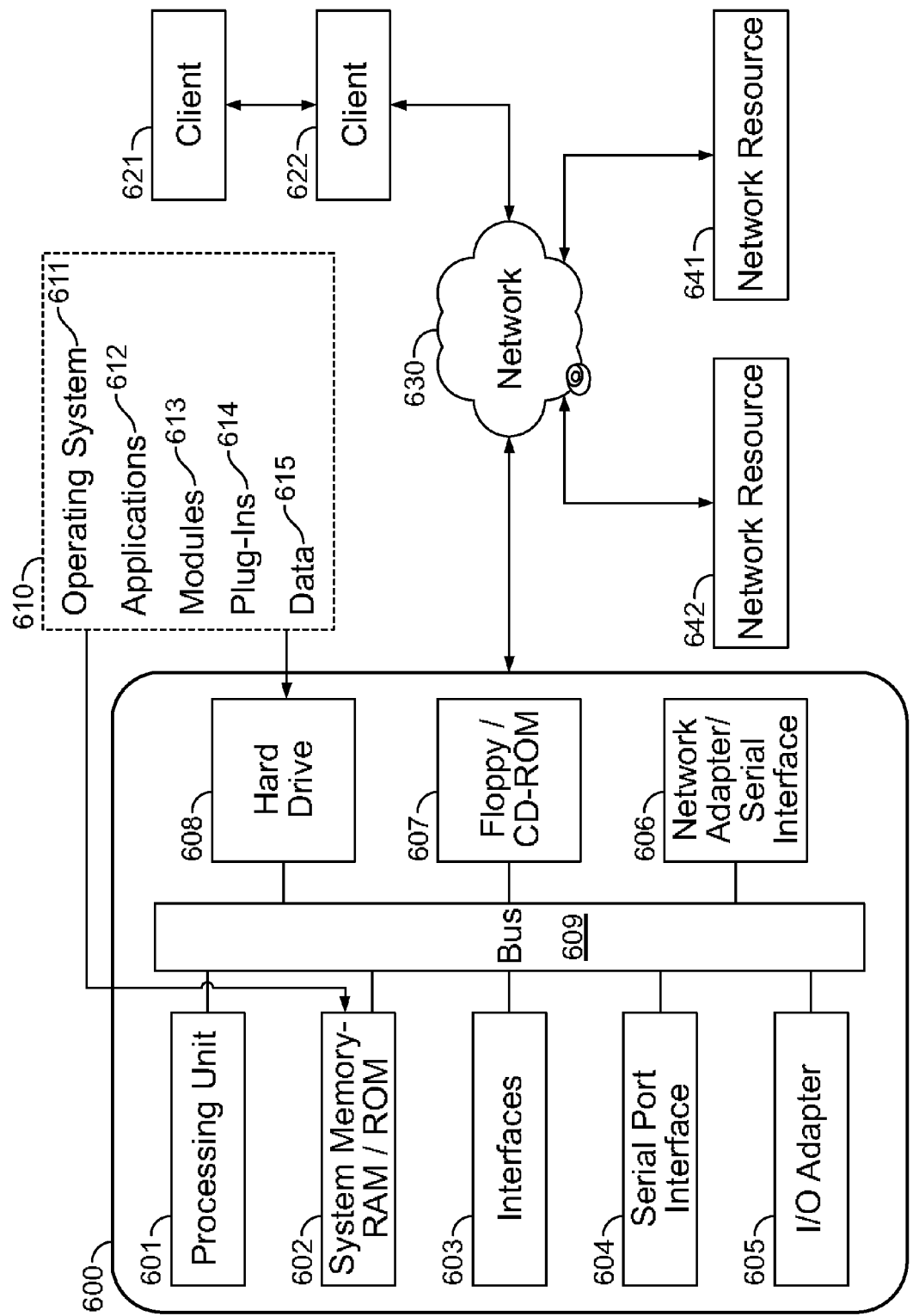
FIG. 6 shows a computer and network as may be employed in accord with embodiments of the invention.

FIG. 6 shows a network and computer as may be employed in accord with embodiments. The computer 600 may be used when designing septic systems, when testing or calibrating septic systems, and when conveying information reporting the designs of septic systems. The computer 600 may include processing unit 601, system memory 602, interfaces 603, serial port interfaces 604, input output adapter 605, a hard drive 608, floppy CD-ROM 607, and network adapter serial interface 606. Each of these components may themselves be connected to one another directly and/or through a bus 609. Instructions, which may serve to configure the computer 600 in a particular fashion consistent with embodiments of the invention, may be stored on the hard drive as well as the system memory RAM and ROM 602. These instructions may include operating system 611, application 612, modules 613, plug-in 614, and data 616.

In embodiments, the computer 600 may be connected to a cloud network 630, which itself may have access to various clients 621 and 622, as well as network resources 641 and 642. Embodiments may include computers configured to carry out calculations for sizing equipment in flow rates of equipment as well as computers configured to test or calibrate existing inventive systems or components of systems. The computer may be configured to select or size the downstream pressure gradient systems as well as the upstream pressure gradient systems. Other components that may also be selected or sized by the configured computer. This sizing or calculation may include the size of the inlet and outlet pipes, and the target sealing or transport pressures for the compressible fluid flow restrictors upstream and downstream of the treatment tank. The computer may be further configured to receive and consider testing results from probes placed atop or in the septic system for testing effluent or remediation values at various points of the septic system. These probes may be used during set up, periodic maintenance, and at other times as well.

Figure 7:
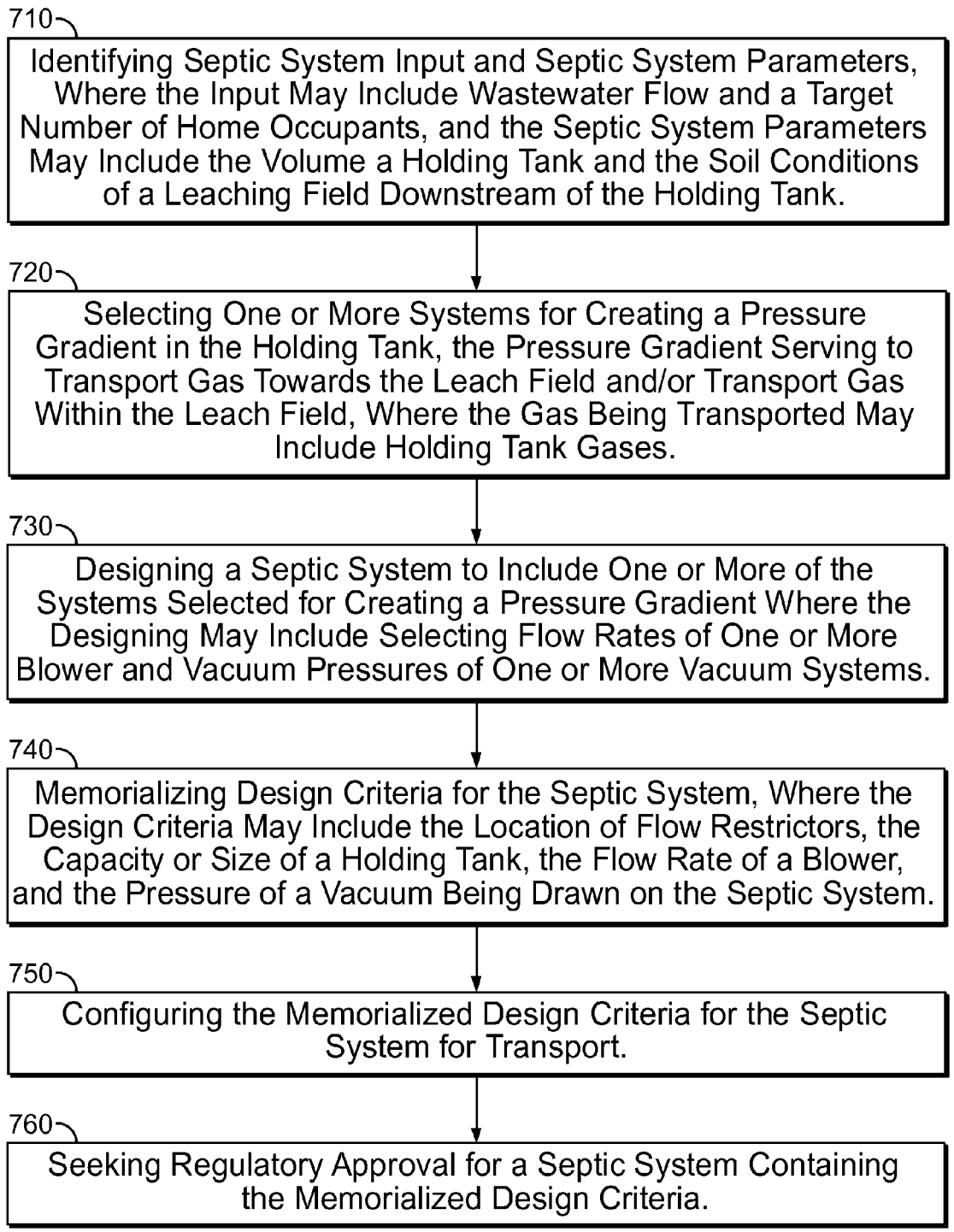
FIG. 7 shows elements of a process as may be partially or fully employed in accord with embodiments of the invention.

FIG. 7 shows features of a process that may be partially or completely employed in embodiments. As shown at 710, the process may include identifying septic system input and septic system parameters when designing a septic system. The input may include wastewater flow into the septic system from a source such as a retail establishment, office building, home, or other generator of wastewater. The above may also include a target number of home occupants when the input is a residential or other generator. The septic system parameters may include the size of the treatment tank, treatment tank design, wastewater strength, total suspended solids, Biochemical Oxygen Demand and other suspended solids characteristics, soil conditions of the leaching field downstream of the treatment tank, pipe sizes of the input and output to the treatment tank, as well as sizing of the pipes in the leaching field. Other considerations may include changes in elevation between sub-surface components, depth of system, surface loading conditions, and pressure gradients to be created, used, or maintained.

As shown at 721, one or more systems for creating a pressure gradient in the treatment tank may be selected. This pressure gradient may serve to transport holding tank gas towards the leach field or transport gas within the leach field itself. As noted, these holding tank gases may include methane or other greenhouse gases. The pressure gradient in the treatment tank may serve to limit the transport or escape of the treatment tank gases upstream in the septic tank system. In other words methane, or other gas, may be retarded or restricted from flowing back through the source of the wastewater.

As shown at 730, designing a septic system may include selecting from one or more system components to create a pressure gradient sufficient to transport and remediate treatment tank gases, including methane. The sizing, calibration, and layout of these system components may include flow rates for a blower, pressure rates for a vacuum, and trap sizes for compressible fluid restrictors.

As shown at 740, the process may also include memorializing the design criteria for the septic system. These memorialized specifications may include the location of flow restrictors, the capacity or size of the treatment tank, the flow rate of a blower, the pressure of vacuuming drawn on the septic system, and the location and orientation of components. There may be other criteria as well.

As shown at 750, the memorialize design criteria may be configured for transport. This may include saving an electronic file in a CAD format, in a document editor format, or other portable file that may be reopened.

At 760, regulatory approval for the septic system design may also be sought. Seeking this approval may include providing a regulatory authority influent and effluent flow rates of wastewater, blower and/or vacuum sizes and flow rates, the location of components within the septic system: including the distance between them the relative elevation of them, and their respective sizes. The sizes may include pipe sizes, as well as trap sizes, and/or restrictor sizes. In embodiments the restrictor sizes may be sized by the amount of pressure needed to open the restrictor or to allow flow of fluid or not compressible fluid upstream in the restrictor. Other criteria may be used as well.

In embodiments a computer processor may be configured to prompt some or all of the steps described herein. These may include displaying for a user, various septic system parameters and inputs, as well as a selection of various septic system components that can be used in the design of the septic system. The processor may be further configured to receive input, and provide additional prompts for further design selections and/or for saving them.

Still further, the processor may be configured, with instructions, to retain or otherwise memorialize the design selections and to, in embodiments, provide a portable file after the design session. Consistent with the above, this design file may be used to permit or otherwise receive approvals for the design septic system.

In embodiments, design considerations can also include soil conditions, temperature conditions, or other local criteria that can serve to affect the pressure gradient within the septic system, the flow of compressible fluids within the septic system, or the exhaust of these compressible fluids in the leaching field or out of the leaching field as well.

Still further, in embodiments, remediation of the leach field may be bolstered by aerobic conditions introduced into the leach field. Aerobic bacteria may serve to remediate methane or other treatment tank gases, thereby serving to reduce the amount of methane discharge from the leaching field. Also, as noted above, the sizing of the blower, the sizing the vacuum, the sizing of the restrictor, as well as the sizing and selection of other design septic components may affect the discharge of methane or other treatment tank gases in the leach field. In embodiments, the discharge of negligible methane or other treatment tank gases may be preferred.

Preferred discharges may depend on temperature, the amount of organic material in wastewater (BOD), and total suspended solids. In embodiments, the more organic matter present in the wastewater, the more methane may be generated and in need of remediation. Likewise, levels of hydrogen sulfide may affect flow rates or other settings as the odors from this gas may create a nuisance that can be mitigated in embodiments.

In embodiments, probes or other sensors positioned in the leach field, tank, or elsewhere in the septic system, which are calibrated to monitor holding tank gases, such as methane, may be used to adjust flow rates or pressures in the septic system during installation or afterwards. These readings may also be used to toggle the blowers or vacuums off or on.

In embodiments, a calibration device may be provided such that flow rates can be adjusted based upon the input of sensors positioned in the leach field or elsewhere, making measurements of the septic system. This calibration device may serve to adjust flow rates of a blower, and/or pressure rates of a vacuum drawing on a holding tank or other component of the septic system.

The calibration device may itself include a processor, an input, and a storage device, where the stored device retains instructions. The calibration device may be configured to receive inputs reflecting effluent gases or the absence of effluent gases above the leach field, and to make recommendations as to settings that may be used elsewhere for components of septic systems taught herein.

In embodiments, a collector may be used in conjunction with the calibration device. The calibration device may be connected to or receive input from a simple port of the collector such that a sample can be measured and or considered. In embodiments, the calibration device may take a sample from a sample port for a predetermined amount of time, and based upon the sample results, provide recalibration settings for septic system components already in use. In other words, a collector may be resident in the system, such that sample to be taken from the leaching field after the installation of the leaching field is complete. In so doing, a septic system calibration can be honed or reconsidered over time.

In embodiments, the sample effluent collector may be tall enough to reach down through the top soil and any sandy loam positioned above the leaching field, such that the collector collects gases at or near a filter fabric layer of the leaching field. Depending upon the consistency of the top soil and or the sandy loam or other material above the leach field, the sample duration may vary and be adjusted accordingly.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of means or steps plus function elements in the claims are intended to include any structure, material or act for performing the function in combination with other claimed elements are specifically claimed.

The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A wastewater treatment system comprising:
a subsurface wastewater treatment tank in fluid communication with a plumbing vent, the treatment tank substantially protected from ground water entry and rain water entry; and
a first pressure gradient system in fluid communication with the treatment tank, the pressure gradient system acting on head space in the treatment tank to create a pressure gradient serving to transport head space gases towards a leaching field downstream of the treatment tank.

2. The system of claim 1, further comprising:
a second pressure gradient system in fluid communication with the treatment tank, the second pressure gradient system acting on head space in the treatment tank to create a pressure gradient serving to transport head space gases towards the leaching field downstream of the treatment tank,
the second pressure gradient system downstream of the holding tank and the first pressure gradient system upstream of the treatment tank.

3. The system of claim 1 wherein the pressure gradient system includes a compressible fluid flow restrictor and wherein wastewater flows through the flow restrictor before reaching the treatment tank.

4. The system of claim 1 further comprising a radon gas line in fluid communication with the first pressure gradient system.

5. The system of claim 1 wherein the first pressure gradient system is configured to create pressure in the treatment tank on a periodic basis, having periods where pressure is created by the first pressure gradient system and periods where pressure is not created by the first pressure gradient system and wherein the treatment tank is anaerobic.

6. The system of claim 1 further comprising:
a sensor configured to monitor levels of methane in the treatment tank; and
a processor processing signals reflecting monitored levels of methane in the treatment tank and generating instructions for activating or deactivating a blower or vacuum of the first pressure gradient system.

7. The system of claim 1 further comprising a wastewater filter downstream of the treatment tank and in fluid communication with the treatment tank.

8. The system of claim 1 wherein the pressure gradient system includes a blower in fluid communication with gas in the treatment tank.

9. The system of claim 1 wherein the pressure gradient system includes a vacuum device in fluid communication with gas in the treatment tank.

10. The system of claim 1 wherein the subsurface treatment tank is serving a residential home and wherein wastewater passes through the first pressure gradient system before reaching the treatment tank.

11. The system of claim 1 wherein the first pressure gradient system when acting on head space in the treatment tank includes a vacuum device downstream of the treatment tank or a blower upstream of the treatment tank,
 wherein the vacuum device is configured to draw substantially thirty-five CFM or more of head space gas from the treatment tank, and
 wherein the blower is configured to push five CFM or more of gas into the treatment tank.

12. The system of claim 1 wherein the treatment tank is aerobic.

13. The system of claim 1 further comprising a first check valve installed downstream of the treatment tank and upstream of the leaching field and wherein gas is withdrawn from the treatment tank and directed into the leaching field.

14. The system of claim 6 further comprising:
 computer readable memory, wherein the computer readable memory contains instructions, which when executed by the processor, further configure the processor to:
  upon receipt of an input indicating a sample result representing effluent gas from a subsurface leaching field of a sampled treatment system, compare the input indicating the sample result with a target for effluent gas, and
  provide one or more pressure or vacuum settings for a pressure gradient system acting on the sampled treatment system.

15. The system of claim 14 wherein the instructions, which when executed by the processor, further configure the processor to:
 provide a schedule under which a blower or vacuum, acting on the sampled leaching field, may be activated or deactivated.

16. The system of claim 14 wherein the input indicating a sample result is taken from a probe inserted into a sampling port of a sampling cover placed atop the subsurface leaching field and wherein the instructions, which when executed by the processor, further configure the processor to:
 prompt for or consider the size or volume of the sampling cover in which the probe was inserted; and
 prompt for or consider a duration of time in which the probe is inserted into the sampling port.

17. The system of claim 14 wherein comparing the input indicating the sample result with a target for effluent gas includes considering a sampled level of methane gas and comparing that sampled level of methane gas with a target level of methane gas.

18. The system of claim 14 wherein comparing the input indicating the sample result with a target for effluent gas includes considering a sampled level of hydrogen sulfide gas and comparing that sampled level of hydrogen sulfide gas with a target level of hydrogen sulfide gas.

19. The system of claim 14 wherein the instructions, which when executed by the processor, further configure the processor to provide a dosing schedule for vacuum settings or pressure settings of a pressure gradient system acting on the sampled septic system.

20. The system of claim 14 wherein comparing the input indicating the sample result with a target for effluent gas includes considering a sampled level of radon gas and comparing that sampled level of radon gas with a target level of radon gas.

21. The system of claim 14 wherein the processor is further configured to:
 upon receipt of an input indicating a sample result representing effluent gas from the leaching field of the sampled treatment system, compare the input indicating the sample result with a target for effluent gas, and
 provide one or more pressure or vacuum settings for the pressure gradient system acting on the sampled treatment system.

* * * * *